(No Model.)
N. S. KETCHUM.
SAND BAND AND CLIP FOR VEHICLE AXLES.
No. 387,646. Patented Aug. 14, 1888.
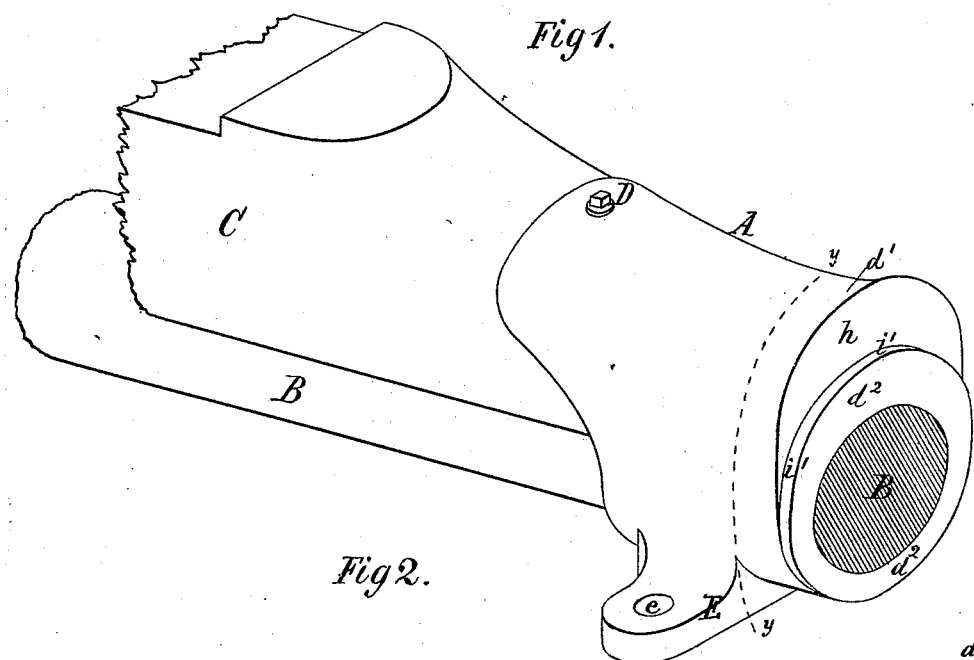
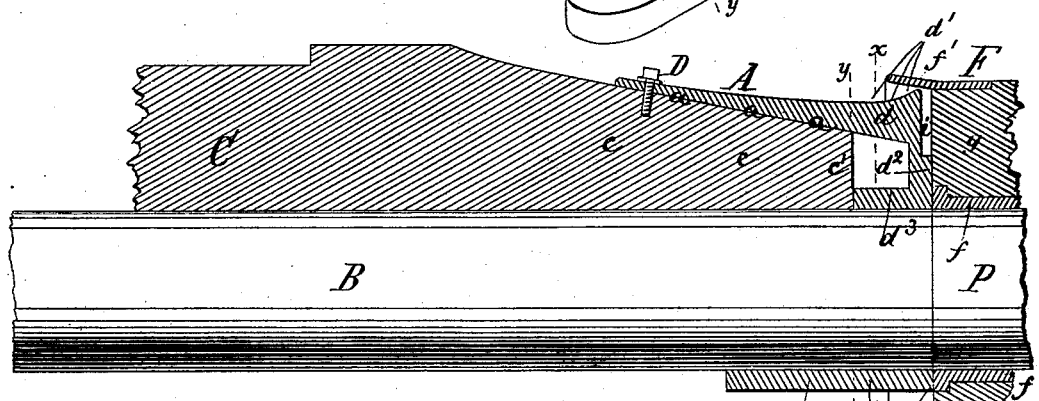
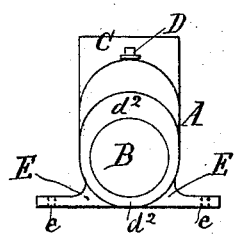
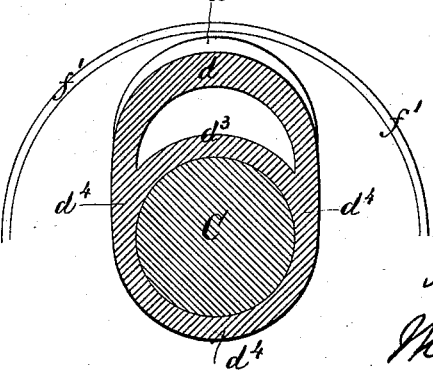
Witnesses:
J. P. Theo. Lang
E. J. Fenwick
Inventor:
Nathaniel S. Ketchum,
by his atty,
Mason, Fenwick & Lawrence.
N. PETERS, Photo-Lithographer, Washington, D. C.

UNITED STATES PATENT OFFICE.

NATHANIEL S. KETCHUM, OF MARSHALLTOWN, IOWA.

SAND-BAND AND CLIP FOR VEHICLE-AXLES.

SPECIFICATION forming part of Letters Patent No. 387,646, dated August 14, 1888.

Application filed April 12, 1888. Serial No. 270,422. (No model.)

*To all whom it may concern:*

Be it known that I, NATHANIEL S. KETCHUM, a citizen of the United States, residing at Marshalltown, in the county of Marshall and State of Iowa, have invented certain new and useful Improvements in Combined Collar, Sand-Band, and Clip for Vehicle-Axles; and I do hereby declare the following to be a full, clear, and exact description of the invention, such as will enable others skilled in the art to which it appertains to make and use the same.

My improvement relates to the forming in one homogeneous structure of metal a collar, sand-band, and clip for wagon or vehicle axles, as will be hereinafter particularly described, and specifically claimed.

In the drawings, Figure 1 is a perspective view of my combined collar, sand-band, and clip applied to the axle and wood-stock of a wagon or vehicle. Fig. 2 is a vertical central longitudinal section of Fig. 1; Fig. 3, a transverse section in the line $xx$ of Fig. 2, and Fig. 4 an end view or elevation in end view of Fig. 1.

Heretofore various devices have been resorted to for holding in place or in juxtaposition the ends of the wood-stock of vehicle-axles and that portion of the axle inside of but nearest to the hubs of the wheels; also for affording means whereby the usual braces may extend from the axle to the reach-plate or other part of the vehicle, and also for shielding the spindle or that part of the axle inclosed by the lining of the wheel-hub from the entrance of sand and dirt, all of which purposes I have subserved in a single homogeneous structure of metal, and which, as a construction, I designate as my improved "combined collar, sand-band, and clip" for vehicles.

In Fig. 1 I show in perspective view my improved structure, a combined collar, sand-band, and clip, A, applied in normal position upon a vehicle-axle, B, and its wood-stock C, the parts being retained in juxtaposition when not in working use simply by retaining screw-bolt D, said bolt passing through the collar portion of the structure A and into the wood-stock C, as in Figs. 1 and 2. The axle B is round, and may either be solid or tubular, and the under side of the wood-stock C is correspondingly grooved longitudinally to a depth sufficient to let the upper longitudinal half of the axle seat itself therein, as shown. The end portions, $c\ c'$, of the wood-stock C being made tapering and oval, as shown, the structure A may thus be seated in position, as in Figs. 1 and 2, under a wedging action, the interior of the structure A being made of a corresponding form to admit of such action.

Forward of the dotted lines $y\ y$ the structure A at $a$ is so formed that it subserves the purpose of a wedging-collar to inclose and tightly bind together the axle and the tapering oval portions $c\ c\ c'$ of the wood-stock C, while laterally from the bottom portion brace-rod lugs, as E, extend on either side, as shown, having bolt-holes $e$ therein, to which to bolt the usual brace-rods of the axle, and thus serve the purpose of an ordinary clip from which to extend such rods.

In rear or outwardly from the line $y\ y$ the combined structure A at its upper portion is made of increased thickness, as at $d$, and with an upwardly-slanting sand-shield surface, $d'$, whereby any dirt or sand which might fall upon the top of the structure A will constantly tend, under the movement of the vehicle, to collect or concentrate at a point coincident with the dotted line $x\ x$, and therefrom fall down along the sides of the structure to the ground. This portion $d$, it will be seen, is integrally connected with an abutting portion, $d^2$, for the body portion $g\ g'$ of the wheel-hub F of the vehicle and its lining or box $f$ to abut against when rotating while in juxtaposition, as shown in Fig. 2, and at $d^3$ a wall in circular outline, as in Fig. 3, is formed, against which the extreme end $c'$ of the wood-stock C abuts when fully forced into the structure A, as shown. Thus this wall $d^3$, which serves as an abutment for the wood-stock C, also in part incloses the axle, as clearly shown in Fig. 3, such wall becoming merged into an inclosing-band, $d^4$, as shown in Fig. 3, which, in connection with wall $d^3$, entirely surrounds the axle B, thus giving a steady firm bearing to the parts when in position, as shown in the figures. Thus that portion of the combined structure A which lies in rear or outwardly from the dotted line $y\ y$ serves not only as a guard against the entrance of dirt and sand into the hub F and upon its spindle P, but it also serves as a band to bind together the axle B and wood-stock C;

but, while this is the case, it is also constructed to subserve the purpose of absolutely insuring against the entrance of sand or dirt into the vehicle-hub F. To this end it will be seen that the abutment $d^2$ is circularly formed, as clearly shown in Fig. 1, thus practically affording a broad bearing for the hub F, while at the same time such bearing, being made to project out from the surface or wall $h$ of the structure A, as shown in Fig. 1, will leave a traveling space, $i$, between the hub F at $g$ and the thickened upwardly-inclined or slanting portion, as $d$. This space $i$ communicates with space outside the wheel-hub F, between the collar $f'$ of the hub and the extreme upper edge of the portion $d$, as shown in Fig. 2, and thus with such construction, if the heat of the axle or the rapid rotation of the hub when in motion, or the action of both combined, should cause any sand or dirt to be drawn up over the upper edge of the upwardly-inclined portion $d$ into the sand and dirt space $i$ the same would, by gravity and the rotary movement of the hub, be carried down the edge surface $i'$ of the abutment $d^2$, and so be discharged upon the collar $f'$ at the point $f^2$, and thence to the ground, as indicated by the arrow. Under this construction it is sufficient to utilize the bolt D for only retaining the structure A in position, as in Fig. 1, and that when the same is in connection with the hub of a wheel upon the spindle portion P of the axle B, as illustrated in Fig. 2, the retention of the structure A in normal position will be fully secured from endwise displacement by re-enforce of the hub, the latter being itself secured from displacement on its spindle P, and, further, that owing to the oval outline surface formed by the union of the axle B and wood-stock C, as shown in cross-section, to and upon which the structure A is fitted or wedged, said structure cannot be moved laterally when once in normal working position.

What I claim is—

1. In an unsplit, inexpansible, combined collar, sand-band, and clip made in one piece, as described, the wall $d^3$, in combination with the portions $d$ $d^4$ and collar $d^2$, the said wall $d^3$ extending beyond the back of the collar and forming an abutment for the wooden stock, and also forming an elongated substantial upper bearing for the axle, substantially as described.

2. In the unsplit, inexpansible, combined sand-band, collar, and clip made in one piece, as described, the wall $d^3$, in combination with the portion $d$, formed with the unbroken upwardly-sloping surface $d'$ for guiding away the sand, collar $d^2$, cut away to form the sand-escape $i$ between the portion $d$ and the hub, and the portion $d^4$, substantially as described.

3. The unsplit, inexpansible, combined sand-band, collar, and clip made in one piece, as described, having the portion $d$, sloped at $d'$, wall $d^3$, extended back of the collar, the portion $d^4$, and the horizontally-extended brace-rod lugs E E, substantially as and for the purpose described.

4. The within-described unsplit, inexpansible, combined sand-band, collar, and clip made in one piece, said combined device having the wall $d^3$, forming a bearing and an abutment, and provided with the cut-away collar $d^2$, forming space $i$ between portion $i$ and the hub, and also having the sloped surface $d'$ and portions $d^4$, provided with laterally-extended horizontal brace-rod lugs E E, substantially as and for the purpose described.

In testimony whereof I hereunto affix my signature in presence of two witnesses.

NATHANIEL S. KETCHUM.

Witnesses:
J. G. WEATHERBY,
GEO. J. KIRBY.